(12) United States Patent
Natarajan

(10) Patent No.: US 12,421,454 B2
(45) Date of Patent: Sep. 23, 2025

(54) SYSTEM AND PROCESS FOR PRODUCING MESOPHASE COKE FROM ISOTROPIC PITCH

(71) Applicant: Epsilon Advanced Materials PVT Ltd, Mumbia (IN)

(72) Inventor: Chinnasamy Natarajan, Mumbai (IN)

(73) Assignee: Epsilon Advanced Materials PVT Ltd, Mumbia (IN)

( * ) Notice: Subject to any disclaimer, the term of this patent is extended or adjusted under 35 U.S.C. 154(b) by 227 days.

(21) Appl. No.: 17/999,991

(22) PCT Filed: Jul. 18, 2020

(86) PCT No.: PCT/IB2020/056779
§ 371 (c)(1),
(2) Date: Nov. 28, 2022

(87) PCT Pub. No.: WO2021/240223
PCT Pub. Date: Dec. 2, 2021

(65) Prior Publication Data
US 2023/0212462 A1    Jul. 6, 2023

(30) Foreign Application Priority Data
May 28, 2020 (IN) .............................. 202021022401

(51) Int. Cl.
*C10B 7/14* (2006.01)
*C10B 57/02* (2006.01)
*C10C 3/00* (2006.01)

(52) U.S. Cl.
CPC ............... *C10B 7/14* (2013.01); *C10B 57/02* (2013.01); *C10C 3/002* (2013.01)

(58) Field of Classification Search
CPC .. C10C 3/002; C10B 7/06; C10B 7/14; C10B 57/02
See application file for complete search history.

(56) References Cited

U.S. PATENT DOCUMENTS 4,219,405 A    8/1980   Pietzka et al.
4,924,785 A *  5/1990   Schultz .................. C10B 53/07
                                                   110/236
(Continued)

FOREIGN PATENT DOCUMENTS

| CN | 105623694 B | 9/2018 | |
| GB | 2303859 A * | 3/1997 | ............. C10B 47/46 |
| WO | WO-2007131241 A2 * | 11/2007 | ................ C10B 7/06 |

*Primary Examiner* — Renee Robinson
(74) *Attorney, Agent, or Firm* — Emerson, Thomson & Bennett, LLC; Daniel A. Thomson

(57) ABSTRACT

The present invention provides a system for producing mesophase coke from an isotropic pitch. The system includes a reactor having a first heating zone to carry out pretreating of the isotropic pitch by operating at a temperature of 250° C.-350° C. under atmospheric pressure. The reactor further includes a second heating zone to carry out heating of the pretreated isotropic pitch by maintaining the temperature of 350° C.-500° C. under the atmospheric pressure to obtain mesophase pitch. The reactor includes a third heating zone to carry out heating of the said mesophase pitch by maintaining the temperature of 500° C.-800° C. under the atmospheric pressure to obtain mesophase coke. The system further includes a pusher unit adapted to physically move the container from the entry zone to the exit zone to obtain the mesophase coke.

18 Claims, 8 Drawing Sheets

(56) References Cited

U.S. PATENT DOCUMENTS

| | | | | |
|---|---|---|---|---|
| 5,085,738 A * | 2/1992 | Harris | ............... | C10B 49/14 |
| | | | | 201/3 |
| 2006/0246391 A1 * | 11/2006 | Gaur | ............ | F27D 7/06 |
| | | | | 432/121 |
| 2007/0227417 A1 * | 10/2007 | Aguayo | ............ | F23G 5/004 |
| | | | | 110/276 |
| 2008/0173573 A1 * | 7/2008 | Laurin | ............ | B07B 13/10 |
| | | | | 209/466 |

* cited by examiner

SYSTEM AND PROCESS FOR PRODUCING MESOPHASE COKE FROM ISOTROPIC PITCH

CROSS REFERENCE TO RELATED APPLICATION

The present application is a 35 U.S.C. 371 national stage application of a PCT International Application No. PCT/IB2020/056779, filed on Jul. 18, 2020, which claims the benefit of complete Indian Patent Application number 202021022401 filed on 28 May 2020, the entire disclosures of which are incorporated herein by reference.

FIELD OF THE INVENTION

The present invention relates to a system and a process for producing coke, and more specifically, the present invention discloses a system and a continuous process for producing mesophase pitch and mesophase coke from coal/petroleum tar pitch to be used as feed material to make carbon/graphite electrode for secondary battery.

BACKGROUND OF THE INVENTION

The need for new materials is a constant search, where materials with very specific properties require specific manufacturing equipment and easy process control. Carbon materials have found an important niche in the field of new materials because of having a number of properties (mechanical strength and high modulus, low density, high thermal and electrical conductivity, ion intercalation/absorption properties etc.), which makes them irreplaceable in some applications. One such application is Li ion battery where the pitch or coke is used as carbon precursor to make a carbon/graphite anode.

However, the pitch and coke should be anisotropic in nature and should contain high mesophase content. Accordingly, to overcome this problem, the processes for producing mesophase pitch have come into existence. One such process is disclosed in U.S. Pat. No. 4,904,371.

The said patent discloses an improved process and simple process for producing a carbonaceous pitch product having a controlled mesophase content ranging from about 50 to 100%. The said process includes heating a carbonaceous feedstock substantially free of mesophase pitch at a temperature above 350° C. for about 6 hours in atmospheric pressure.

The said process further includes subjecting the carbonaceous feed to heat soaking in the absence of a sparging gas for up to 10 additional hours in the temperature range of 250° C. to 350° C. Further, the process is followed by again heating the pretreated carbonaceous feed in the presence of a non-oxidative sparging gas for up to 10 hours in the temperature range of 350° C. to 500° C. and thereby forming mesophase pitch.

However, it has been observed that the heat treatment time in above process is up to 20 hours to 30 hours. Further, the inert gas is used in the above disclosed process for blanketing. Since inert gas is used only for blanketing, the said process would consume less amount of gas around 0.25 Cubic Feet Per Hour (SCFH)/lb, resulting in low energy consumption.

Further, a similar process is disclosed in U.S. Pat. No. 4,551,225. The said patent discloses an improved process for preparing an optically anisotropic pitch which includes heating a pitch feed material at a temperature within the range of about 350° C. to 450° C. while passing an inert gas there through at a rate of at least 2.5 Standard Cubic Feet Per Hour (SCFH)/lb of pitch feed material, and then agitating said pitch feed material at a stirrer rate of from about 500 to 600 rpm to obtain an essentially 100% mesophase pitch product suitable for carbon production.

However, it has been found that the treatment time of producing anisotropic pitch and inert gas flow rates are high in the above said process. Moreover, this process requires high RPM stirrer facility and this process yields only mesophase pitch.

Furthermore, another similar process of producing mesophase pitch is disclosed in U.S. Pat. No. 4,631,181. The said process includes producing of mesophase pitch by adding at least one of an alcohol and a phenol to heavy bitumens. Further, the process involves pretreating the mixture in temperature of at least 250° C., and then subjecting the pretreated mixture to heat treatment.

However, it is noted that the above process requires additive and high pressure for producing the mesophase pitch and further does not results in complete anisotropic pitch.

Another process of producing mesophase pitch is disclosed in U.S. Pat. No. 4,704,333. The said process includes converting a pitch into mesophase pitch in the presence of catalytically effective amounts of oxides, diketones, carboxylates and carbonyls of metals selected from vanadium, chromium, molybdenum, iron, nickel, and cobalt.

Another process of producing mesophase pitch is disclosed in U.S. Pat. No. 5,182,010. The said process includes polymerizing a naphthalene derivative having at least one methyl group for about 5-300 minutes at a temperature of about 180° C.-400° C. under a pressure of about 5-100 atmosphere in the presence of about 0.1-20 moles of hydrogen fluoride (HF) and about 0.05-1.0 mole of Boron trifluoride ($BF_3$) per mole of the naphthalene derivative.

However, it is noted that a catalyst is used in the above processes, due to which some percentage of a metal catalyst may remain in the produced mesophase pitch, thereby compromising the purity. Moreover, the process requires high pressure vessels, which would increase capital expenditure and also processing cost.

Another method for producing mesophase is disclosed in U.S. Pat. No. 4,512,874. The said method includes subjecting a petroleum pitch to heat treatment at temperature of 360° C. to 450° C. The said method is followed by transferring the heat-treated pitch to a mesophase growing and coalescing step.

The said method further includes heating the transferred heat-treated pitch in the mesophase growing and coalescing step to cause only the mesophase to grow and coalesce by aging at a temperature higher than 280° C. and lower than 350° C. At last, the said method involves removing a mesophase composed of Q.I. component and Q.S. component from the lower layer in the growing and coalescing step.

However, the above method required two vessels, one for forming the mesophase, and other for mesophase-growing and coalescing. Further, the isotropic material returns to first vessel after separation. Therefore, it becomes difficult to transport very viscous material from one vessel to another vessel.

Furthermore, the U.S. Pat. No. 2,775,549 discloses a process for producing needle-like coke. The said process includes removing components from a high boiling petroleum residuum upon heating at 350° C.-550° C. and subsequently coking the remaining residuum in a quiescent pool.

The U.S. Pat. No. 9,777,221 also discloses a semi-continuous method of producing needle coke for low coefficient of thermal expansion (CTE) graphite electrodes. The said method includes heating a needle coke precursor under pressure, thereby converting 60%-90% of the coal tar distillate into raw coke. The method is followed by calcination of the raw coke to create low coefficient of thermal expansion needle coke.

However, the above processes require high pressure from about 2 kg/cm$^2$ to 7 kg/cm$^2$. Due to this, a system would require expensive coking drums. Moreover, the needle cokes formed in the drums are decoked using high pressure water jets and subsequent processing is required to remove the water from the produced coke.

One more such process is disclosed in U.S. Pat. No. 4,219,405. The said patent discloses the continuous production of coke. The said process includes heating of the hydrocarbon and recycled condensate in a preheated at a rate to increase the mesophase content of the mixture up to 30% to 60%. The process further includes heating the preheated mixture in a coking zone at a rate to form a raw coke having a mesophase content of 70% to 100%. The process is then followed by continuously removing the raw coke from the coking zone and heating the removed coke in a calciner.

However, it is noted that a feed pitch needs to have a mesophase content of 30-60% before entering into the coking zone, which requires additional facility to make feed pitch.

Therefore, a system and simple process for producing controlled mesophase coke is required, which may eliminate the high temperature pumps to transfer viscous pitch, and eliminate high pressure process to reduce the cost of equipment and for ease of operation.

Further, the system and process for producing mesophase coke is required, which may eliminate use of organic solvents, additives or catalyst.

Furthermore, the system and process are required, which may reduce treatment time for producing mesophase coke.

In nutshell, the system and process for producing mesophase coke is required which may overcome above discussed drawbacks and provide easy to operate and a cost-effective method.

SUMMARY OF THE INVENTION

Aspects of the invention are thus directed to system and process for producing mesophase coke from an isotropic pitch. The said system and process are both cost effective and overcome the existing problems by providing high quality mesophase coke.

In an aspect of the present invention, a system for producing mesophase coke from an isotropic pitch. The system includes a reactor, the said reactor includes an entry zone having a container, wherein the said container is being adapted to receive the said isotropic pitch.

The reactor further includes a first heating zone adapted to carry out pretreating of the said isotropic pitch by operating the said first heating zone at a temperature of 250° C.-350° C. under atmospheric pressure. Further, the reactor includes a second heating zone adapted to carry out heating of the said pretreated isotropic pitch by maintaining the temperature of 350° C.-500° C. under the atmospheric pressure to convert the said isotropic pitch to obtain mesophase pitch.

The said reactor further includes a third heating zone adapted to carry out heating of the said mesophase pitch by maintaining the temperature of 500° C.-800° C. under the atmospheric pressure to obtain mesophase coke. Furthermore, the said reactor includes a cooling zone to cool the product form high temperature to low temperature. In addition, the said reactor includes an exit zone adapted to discharge the said mesophase coke from the reactor.

The said system further includes a controlled speed pusher unit adapted to physically move the said container in controlled speed from the said entry zone to the said first heating zone, the said second heating zone, the said third heating zone through the exit zone to obtain the mesophase coke at the said exit zone. This precludes the need of installing expensive pumping system to pump high viscous pitch at high temperature from one reactor to another reactor.

In one embodiment of the present invention, the said isotropic pitch is selected from at least one of coal tar or petroleum tar. The said isotropic pitch is having a softening point (SP) temperature in the range of 80° C. to 120° C., and is having quinoline insoluble (QI) content of less than or equal to 2%.

In another embodiment of the present invention, the system further includes a reservoir being adapted to contain the said isotropic pitch, and feed the said isotropic pitch into the container.

In an embodiment of the present invention, the reactor further includes a cooling zone adapted to cool the said mesophase coke obtained from the third heating zone.

In another embodiment of the present invention, the system further includes a crushing unit being adapted to crush the said mesophase coke into coke granules.

In an embodiment of the present invention, the system further includes a hopper being adapted to store the said coke granules.

Furthermore, the system includes a pneumatic conveying system to transport the said coke granules from the said crushing unit into the said hopper.

The system further includes a vapor condensing unit and oil storage unit being adapted to condense pitch evaporated from the system to obtain condensate oil.

In aspect of the present invention, a process for producing mesophase coke from an isotropic pitch is disclosed. The process includes feeding an isotropic pitch into a container placed in an entry zone of a reactor. The said process is followed by physically moving the said container to a first heating zone via a pusher unit, wherein the said container is moving in a linear motion inside the said reactor.

The said process further includes physically moving the said container from the said first heating zone via the pusher unit to a second heating zone. The said process is continued with heating pretreated isotropic pitch inside the said second heating zone of the said reactor by maintaining the temperature of 350° C.-500° C. under the atmospheric pressure to obtain a mesophase pitch.

Furthermore, the said process includes physically moving the said container from the second heating zone via the said pusher unit to a third heating zone via the pusher unit. The said process is followed by heating the said mesophase pitch inside the said third heating zone of the said reactor by maintaining the temperature of 500° C.-800° C. under the atmospheric pressure to obtain mesophase coke.

Furthermore, the said process includes physically moving the said container from the said third heating zone via the said pusher unit to a cooling zone, and discharging the said mesophase coke from an exit zone of the said reactor.

In an embodiment of the present invention, the process further includes feeding the said isotropic pitch into the container from a reservoir.

In another embodiment of the present invention, the process includes cooling the said mesophase coke in the said cooling zone.

In an embodiment of the present invention, the process further includes physically moving the said container from the said cooling zone via the pusher unit to an exit zone.

In another embodiment of the present invention, the process includes crushing the said mesophase coke to coke granules inside a crushing unit.

Further, in another embodiment of the present invention, the process includes transporting the said coke granules from the said crushing unit into a hopper using a pneumatic conveying system.

In another embodiment of the present invention, the process further includes comprises recovering and storing the unused pitch. The said recovering step includes evaporating the unused pitch from the said reactor condensing of the said evaporated pitch in a condensing unit to obtain condensate oil and the same is stored in the storage tank.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

DESCRIPTION OF THE DRAWINGS

The advantages and features of the present invention will become better understood with reference to the following detailed description taken in conjunction with the accompanying drawings, in which.

Like numerals denote like elements throughout the figures.

DESCRIPTION OF THE INVENTION

The exemplary embodiments described herein detail for illustrative purposes are subjected to many variations. It should be emphasized, however, that the present invention is not limited to a system and process for producing mesophase coke as disclosed. It is understood that various omissions and substitutions of equivalents are contemplated as circumstances may suggest or render expedient, but these are intended to cover the application or implementation without departing from the spirit or scope of the present invention.

Unless otherwise specified, the terms, which are used in the specification and claims, have the meanings commonly used in the field of system for producing coke and process involved therein. Specifically, the following terms have the meanings indicated below.

The terms "a" and "an" herein do not denote a limitation of quantity, but rather denote the presence of at least one of the referenced items.

The terms "having", "comprising", "including", and variations thereof signify the presence of a component.

The term "mesophase" herein refers nematic liquid crystal structure, which can be easily graphitizable and can be used as a promising feed material to prepare anisotropic graphite materials with high performance and multifunction.

Figure 1:
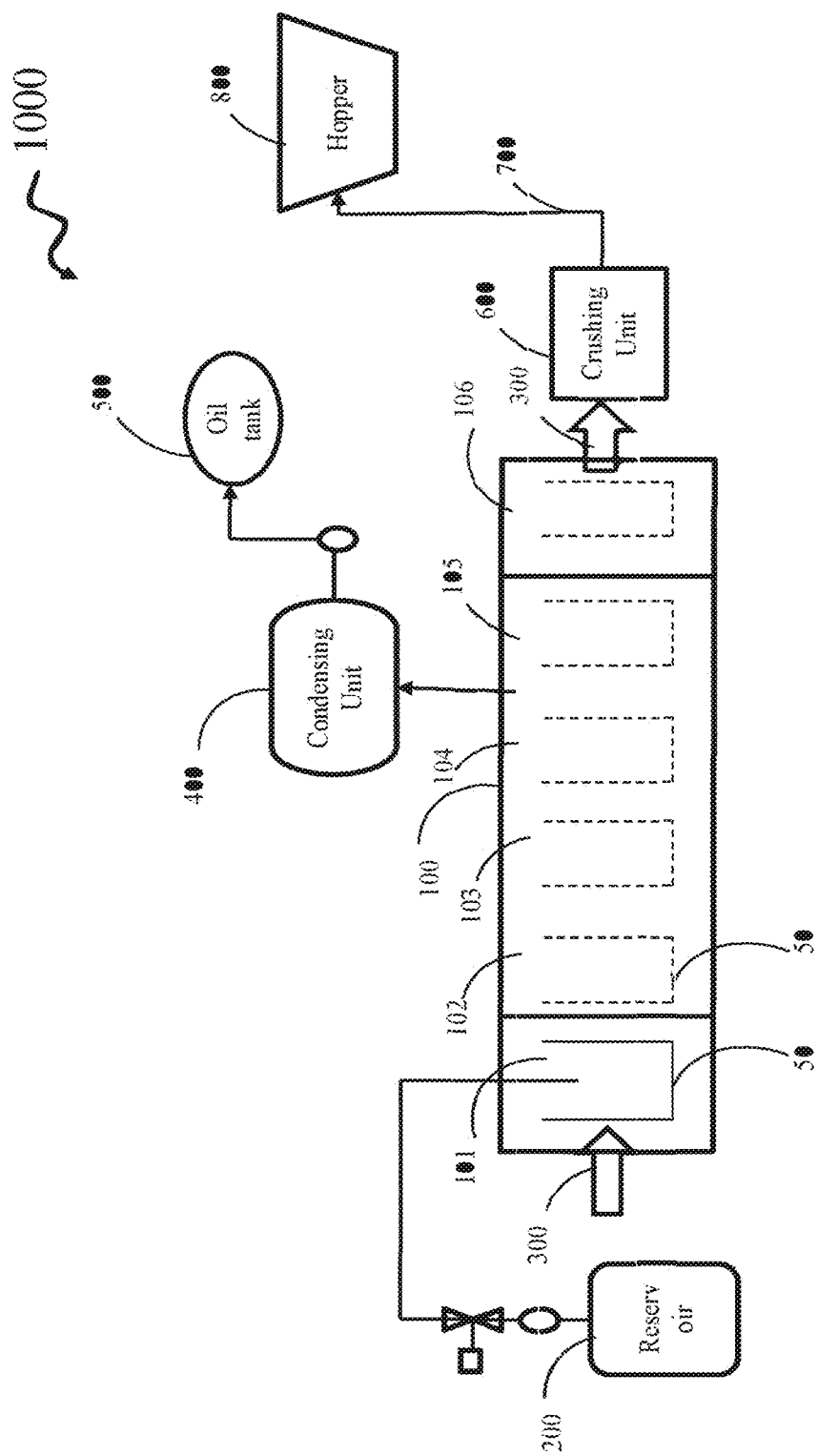
FIG. 1 illustrates an exemplary block diagram representing system for producing mesophase coke from an isotropic pitch, according to various embodiments of the present invention.

FIG. 1 illustrates an exemplary block diagram of a system (1000) for producing a mesophase coke from an isotropic pitch. The said system (1000) includes a reservoir (200) containing the said isotropic pitch. In one embodiment of the present invention, the said isotropic pitch is selected from at least one of coal tar or petroleum tar.

Further, it will be appreciated by those skilled in the art that the said isotropic pitch usually has high amount of aromatic content and less than or equal to 2% of quinoline insoluble (QI) content. Furthermore, the isotropic pitch selected has a softening point (SP) temperature in the range of 80° C. to 120° C. The said isotropic pitch used may be in liquid or solid state.

In the said embodiment of the present invention, the said isotropic pitch with above parameters may influence the type of the final product, which is mesophase coke obtained, and the electrochemical properties thereof.

Further, as shown in FIG. 1, the said system (1000) includes a reactor (100) to carry out production of the said mesophase coke from the said isotropic pitch.

The reactor (100) includes a plurality of zones (101), (102), (103), (104), (105), (106). In an embodiment of the present invention, the said plurality of zones includes an entry zone (101) having a container (50).

The said container (50) is adapted to receive the said isotropic pitch from the said reservoir (200).

In the said embodiment, the said isotropic pitch is pumped to the said container (50) in a predetermined quantity.

As shown in FIG. 1, the said plurality of zones (101), (102), (103), (104), (105), (106) further includes a first heating zone (102) inside the said reactor (100). The said first heating zone (102) is adapted to carry out pretreating of the said isotropic pitch.

More specifically, in the said embodiment of the present invention, a pre-conditioning of the said isotropic pitch takes place at a temperature of 250° C. to 350° C. under atmospheric pressure to reduce or eliminate many of the volatile emissions of the said isotropic pitch.

Further, the said plurality of zones (101), (102), (103), (104), (105), (106) includes a second heating zone (103) inside the said reactor (100). The said second heating zone (103) is adapted to carry out heating of a pretreated isotropic pitch.

More specifically, a pyrolysis of the said pretreated isotropic pitch takes places inside the said second heating zone (103) at a temperature of 350° C. to 500° C. under atmospheric pressure to convert the said isotropic pitch into a mesophase pitch.

In the said embodiment of the present invention, at the said temperature range, the change in the physical appearance and chemical composition of the said isotropic pitch takes place. More specifically, the formation of the mesophase occurs in the said isotropic pitch. Subsequently, this may lead to the conversion of the said isotropic pitch into anisotropic phase.

Further, in the said embodiment, the mesophase pitch appears as spheres, and formation rate of the said mesophase depends on the chemical composition of a precursor i.e. said isotropic pitch.

More preferably, the formation of the said mesophase depends on the residence time of the isotropic pitch in the reactor (100) and temperature condition for producing said mesophase coke.

Further, more specifically, stacked flat molecules of the said pitch, form the mesophase spheres. Accordingly, the said mesophase spheres enlarge and merge together to form a bulk mesophase pitch at the end of the second heating zone (103).

Further, the said plurality of heating zones (101), (102), (103), (104), (105), (106) further includes a third heating zone (104) inside the said reactor (100). The said third heating zone (104) is adapted to carry out heating of the said mesophase pitch obtained at the end of the said second heating zone (103).

More specifically, pyrolysis of the said mesophase pitch is carried out inside the said third heating zone (104) at a temperature of 500° C. to 800° C. under the atmospheric pressure for a predetermined time. More preferably, the said mesophase pitch is converted into a mesophase coke in the temperature range of 500° C. to 600° C. in the third heating zone (104).

The said mesophase coke obtained after the third heating zone (104) is anisotropic in nature and has a mesophase content of 80% to 100% percent.

In another embodiment of the present invention, the said first heating zone (102), the said second heating zone (103) and the said third heating zone (104) further includes multiple heating zones there within for having a fine control on the temperature inside the heating zones (102), (103), (104). More preferably, the said multiple heating zones operate at the temperature in which the said mesophase coke would be of high quality.

In one embodiment of the present invention, the plurality of zones (101), (102), (103), (104), (105), (106) further includes a cooling zone (105). The said cooling zone (105) is adapted to cool the said mesophase coke obtained at the end of the said third heating zone (104) (refer FIG. 1).

Furthermore, the said plurality of zones (101), (102), (103), (104), (105), (106) includes an exit zone (106) inside the said reactor (100). The said exit zone (106) is adapted to store the said mesophase coke that is obtained from the said cooling zone (106) (refer FIG. 1).

Figure 2:
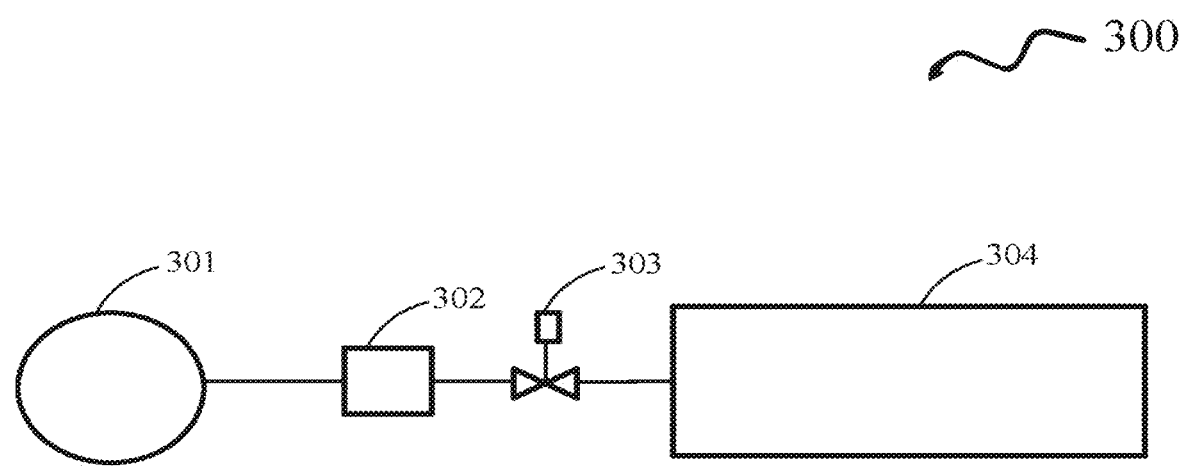
FIG. 2 illustrates an exemplary block diagram of the pusher unit, according to various embodiments of the present invention.

In one embodiment of the present invention, the system (1000) includes a pusher unit (300) (refer FIG. 1 & FIG. 2). The said pusher unit (300) is adapted to physically move the said container form the said from the said entry zone (101) to the said first heating zone (102), the said second heating zone (103), and the said third heating zone (104) through the exit zone (106) to obtain the mesophase coke at the said exit zone (106).

In the embodiment the said pusher unit (300) includes hydraulic pusher system. The said hydraulic pusher system includes a hydraulic pump (302) to allow flow of the said hydraulic fluid from a base (301) through the said fluid hydraulic pusher system to generate hydraulic power. Further, the said hydraulic pusher system includes a hydraulic valve (303) to regulate the flow of the said hydraulic fluid to achieve variable pushing speed. This gives operational flexibility to change the residence time in the said plurality of zones (101), (102), (103), (104), (105), (106) to produce the controlled mesophase material (refer FIG. 2).

The said hydraulic pusher system further includes a hydraulic cylinder (304) to convert the said hydraulic energy into a mechanical energy to push the said container (50) through the said the said plurality of zones (101), (102), (103), (104), (105), (106) (refer FIG. 2).

In another embodiment of the present invention, the system (1000) further includes a crusher unit (600). The said crusher unit (600) is adapted to crush the said mesophase coke discharged from the said exit zone (106) into coke granules (refer FIG. 1). Very small sizes must be screened from the crushed coke, leaving an acceptable size of about less than 20 mm.

In another embodiment of the present invention, the system (1000) further includes a pneumatic conveying system (700). The said pneumatic conveying system (700) is adapted to transport the said coke granules extracted from the said mesophase coke (refer FIG. 1) to a hopper (800), where the said granules stored.

More preferably, the said coke granules are transferred though an enclosed pipeline by using collective force pressure and air into the said hopper (800).

In the said embodiment, the pressure and flow of the air is required to convey the said coke granules form the said crusher unit (600) to the said hopper (800).

In another embodiment of the present invention, the said reactor (100) is further adapted to evaporate some portion of the said pitch.

In this embodiment of the present invention, the system (1000) includes a condensing unit (400). The said condensing unit (400) is adapted to condense the said evaporated unused pitch into condensate oil.

In another embodiment of the present invention, the said system (1000) may further include an oil tank (500). The said oil tank (500) is adapted to store the condensate oil with the said light cracking products.

The underlying process for preparation of mesophase coke as explained in relation to the system (1000) will now be explained with reference to a flow chart, (refer FIG. 3).

At step (10), the said process (900) involves feeding of an isotropic pitch into a container (50) from a reservoir (200). This container (50) is then loaded into a reactor (100).

In an embodiment, the said container (50) is placed in an entry zone (101) of the reactor (100) in a predetermined quantity.

At step (12), the said process (900) includes physically moving the said container (50) filled with said isotropic pitch to a first heating zone (102). Wherein, the said container (50) is moved with a fixed speed in a linear motion.

In the embodiment of the present invention, the physically moving of the container (50) from entry zone to first heating zone (101) is done via a pusher unit (300).

At step (14), the said process (900) involves pretreating of the said isotropic pitch inside the said first heating zone (102) of the said reactor (100). Wherein, the said heating zone operates at a temperature of 250° C. to 350° C. under atmospheric pressure for a predetermined time (refer FIG. 3).

In the embodiment of the present invention, as explained above, the said pretreating or pre-conditioning of the said isotropic pitch is required to reduce or eliminate many of the volatile emissions of the said isotropic pitch.

Further, at step (16), the said process involves physically moving the said container (50) from the said first heating zone (102) via the said pusher unit (300) to a second heating zone (103). Again, it should be appreciated that the material is not moved but the container (50) is moved inside the reactor (100).

In the embodiment of the present invention, after pre-treating of the said isotropic pitch, the said container (50) filled with a pretreated pitch move to the next section i.e. second heating zone (103).

At step (18), the said process (900) involves heating the pretreated isotropic pitch inside the said second heating zone (103) of the said reactor (100) by maintaining the temperature of 350° C.-500° C. under the atmospheric pressure.

In the embodiment, at the said temperature range the change in the physical appearance and chemical composition takes place. More specifically, in the said embodiment the formation of the mesophase occurs in the said pretreated isotropic pitch. Subsequently, this may lead to the conversion of the said isotropic pitch into anisotropic phase.

Further in the said embodiment, the mesophase pitch appears as spheres, and the formation rate of the said mesophase depends on the chemical composition of a precursor i.e. said isotropic pitch.

Further at step (20), the said process (900) involves physically moving the said container (50) from the second heating zone (103) to a third heating zone (104) via the said pusher unit (300).

At step (22), the process (900) is continued with heating of the said mesophase pitch inside the said third heating zone (104) of the said reactor (100) by maintaining the temperature of 450° C.-800° C. More preferably, at the temperature of 480° C.-600° C. under the atmospheric pressure to obtain mesophase coke (refer FIG. 3). Again, it should be appreciated that the material is not moved but the container (50) is moved inside the reactor (100).

At step (24), the process (900) includes physically moving the said container (50) from the said third heating zone (104) via the said pusher unit (300) to a cooling zone (105).

At step (26), the process (900) further includes cooling of the said mesophase coke.

Further, at step (28), the process (900) includes physically moving the said container (50) from the said cooling zone (105) via the pusher unit (300) to an exit zone (106).

Figure 3:
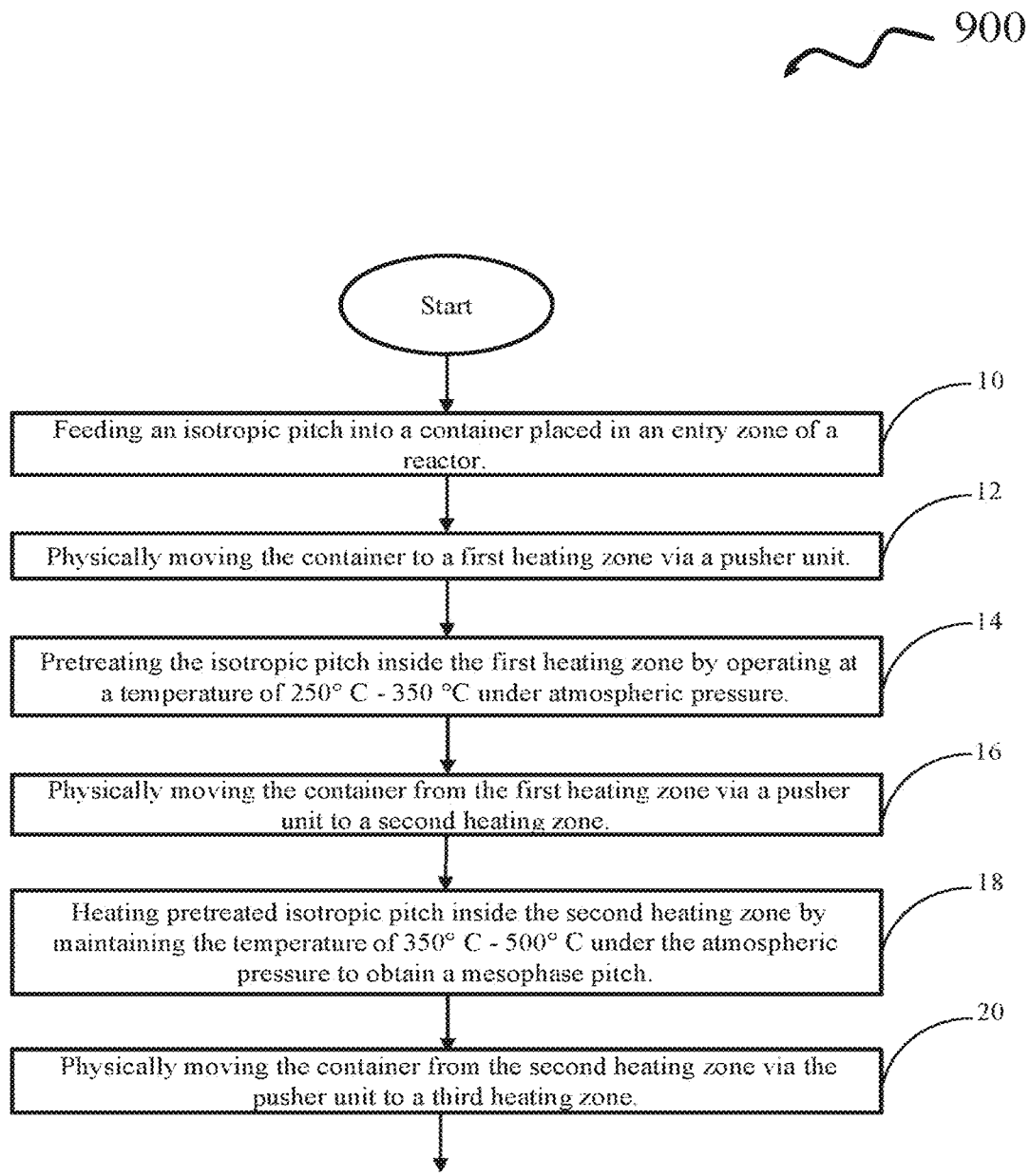
FIG. 3 illustrates a flow chart depicting an exemplary process for producing mesophase coke from an isotropic pitch, according to various embodiments of the present invention.
Figure 3A:
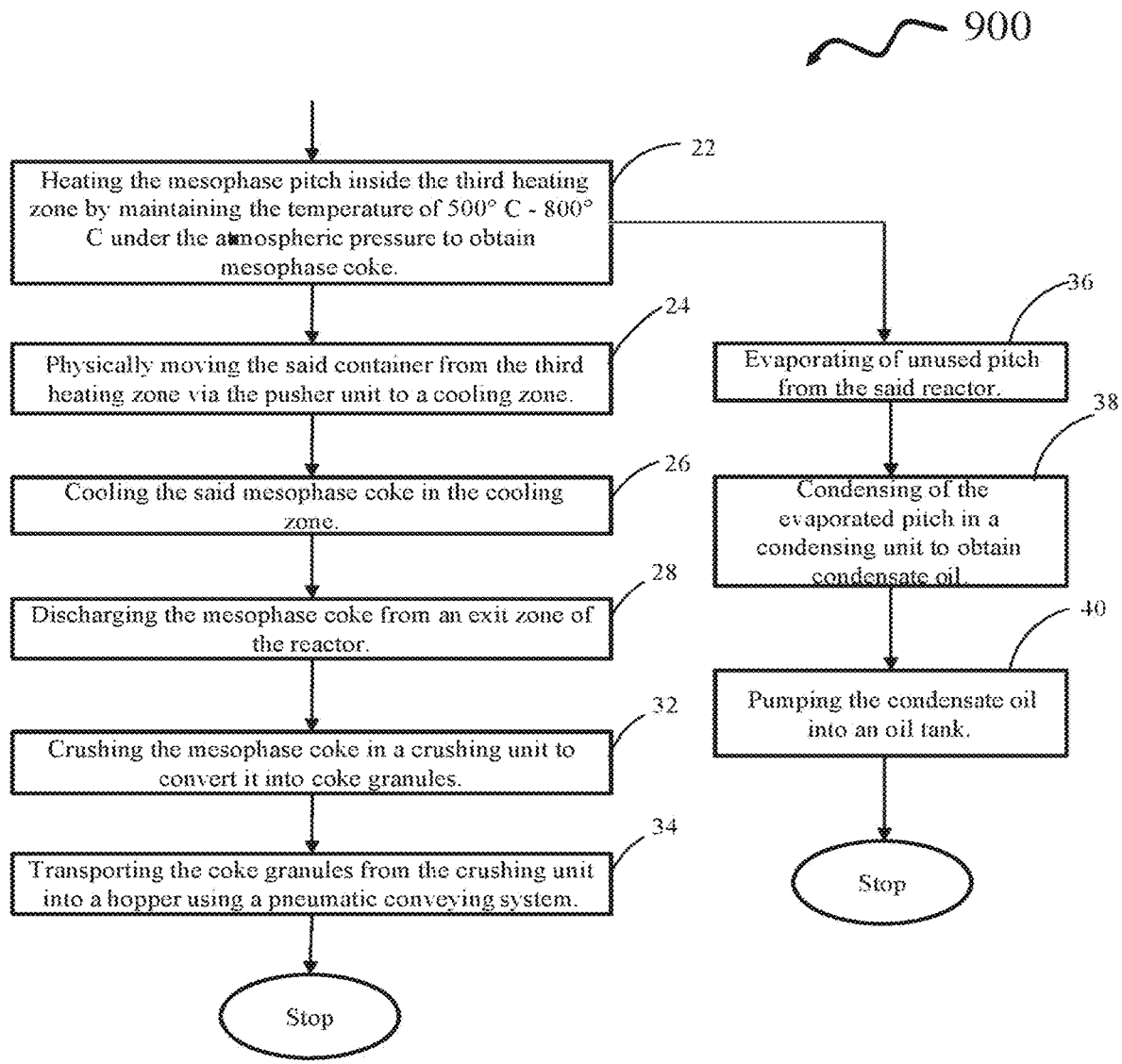

Further, at step (30), the process (900) includes discharging the said mesophase coke from the said exit zone (106) (refer FIG. 3).

At step (32), the process (900) is followed by crushing the said mesophase coke inside a crushing unit (600). Wherein, the said crushing is required to convert the said mesophase coke to coke granules.

Further at step (34), the said process (900) includes transporting the said coke granules from the said crushing unit (600) into a hopper (800) via a pneumatic conveying system (700).

In another embodiment of the present invention, recovering of unused pitch occurs. More preferably, some portion of isotropic pitch evaporates during the production of the mesophase coke inside the said reactor (100) (refer FIG. 3).

In the said embodiment of the present invention, at step (36), the said process (900) includes evaporating the said unused pitch from the said reactor (100) to a condensing unit (400) (refer FIG. 3).

At step (38), the said process (900) further involves condensing of the said evaporated pitch in a condensing unit (400) to obtain condensate oil (refer FIG. 3).

Furthermore, at step (40), the said process (900) includes pumping the said condensate oil in an oil tank (500) (refer FIG. 3).

The system and process disclosed herein is feasible, sustainable, effective and efficient as compared to existing system and process. Further, the present invention ensures the homogeneity of the mesophase coke prepared.

Further, conventionally the mesophase coke is generally made from mesophase pitch with mesophase content of more than 50% with softening point of more than 200° C. However, very few of them have been taken to industrial scale, due to high cost of mesophase pitch.

Therefore, the present invention provides a system and process to produce mesophase coke from pitch having a softening point of less than 200° C.

In the existing batch process, the precursor is pyrolyzed at high pressure until a certain amount of mesophase is prepared. The mesophase pitch is then subjected to a separation process by mechanical or chemical process, which needs complicated equipment and solvents.

Further, the process of producing mesophase coke is carried out in a multiple heating zone of a single reactor, so the present invention does not require high temperature pumps and high pressure to transfer the pitch. As in the existing system and process, the high temperature pumps and high pressure are required to transfer the mesophase pitch from one reactor to another to complete the production of mesophase coke. So far it is been done manufacturing mesophase pitch in a separate reactor/plant, and meso coke in another reactor/plant. In the declared system it is dome in a single reactor.

In addition, a residence time in the present invention is very well controlled by a speed of the pusher unit. Accordingly, it controls the formation of a mesophase spheres during the pyrolytic process to prepare the mesophase coke of reproducible quality. Further, the property of the said prepared mesophase coke is having a particular interest in applications such as in a production of graphite anode for Lithium ion battery.

Further, for a better understanding of the said present invention and to show how the said system and process may be carried into effect, various references will now be made. Using the said system and process four experiments were carried out using different parameters.

Example-1

Figure 4:
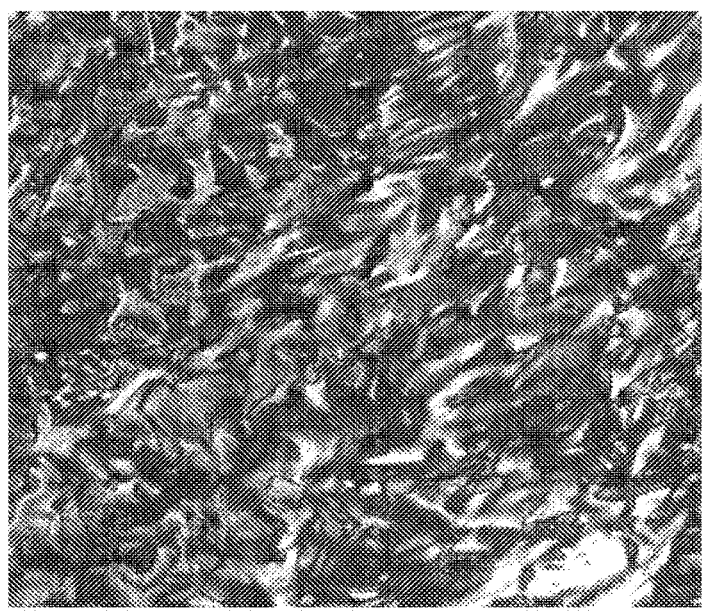
FIG. 4 illustrates an appearance optical micrograph of the mesophase coke, according to various embodiments of the present invention.

The first example illustrates the operation of the present invention with a coal tar pitch with softening point (SP) of 100 and QI of 2%. The temperature of first heating zone (102) was 250° C.-350° C. and the experiment was performed at atmospheric pressure. The temperature of the second heating zone (103) and third heating zone (104) were set to 350° C.-500° C. and 500° C.-800° C., respectively, with the residence time of 10 hours. The bulk mesophase coke obtained from the reactor (100) is containing more than 75% anisotropy. The appearance optical micrograph of the said coke (refer FIG. 4).

The graphite anode prepared from the said coke gives 335 mAh/g with first cycle efficiency of 92%. The said graphite anode charge at 2C to 48% of it is capacity, and discharges 99% at 3C rate.

Example-2

This example no. 2 illustrates the operation of the present invention with a coal tar pitch with SP of 100 with QI of <0.2%. The temperature of first heating zone (102) was 250° C.-350° C. and the experiment was performed at atmospheric pressure. The temperature of the second heating zone (103) and third heating zone (104) were set to 350° C.-450° C. and 450° C.-800° C., respectively, with the residence time of 10 hours. The bulk mesophase coke obtained from the reactor (100) is containing more than 90% anisotropy.

Figure 5:
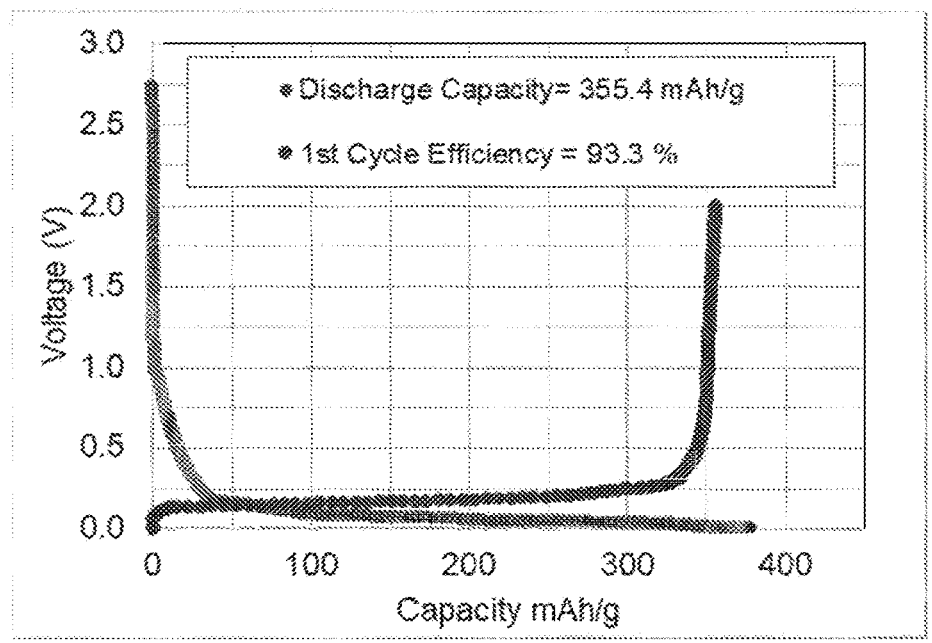
FIG. 5 illustrates a graph representing charging capacity, discharge capacity and first cycle efficiency of a graphite by executing the process parameters according to various embodiment of the present invention.

The graphite anode prepared from the said coke gives 355 mAh/g with first cycle efficiency of 93%. The said graphite anode charge at 2C to 30% of it is capacity, and discharges 92% at 3C rate. The charging and discharging curves of this graphite is shown in FIG. 5.

Example-3

This example illustrates the operation of the present invention with a coal tar pitch with SP of 100 with QI of <0.2%. The temperature of zone 1 was 250° C.-350° C. and the experiment was performed at atmospheric pressure. The temperature of the second heating zone (103) and third heating zone (104) were set to 350° C.-430° C. and 450° C.-800° C., respectively, with the residence time of 20 hours. The bulk mesophase coke obtained from the reactor (100) is containing more than 90% anisotropy.

The graphite anode prepared from the said coke gives 362 mAh/g with first cycle efficiency of 93%. The said graphite anode charge at 2C to 30% of it is capacity, and discharges 91% at 3C rate.

Example-4

This example illustrates the operation of the present invention with a coal tar pitch with SP of 100 with QI of <0.2%. The temperature of first heating zone (102) was 250° C.-350° C. and the experiment was performed at atmospheric pressure. The temperature of the second heating zone (103) and the third heating zone (104) were set to 350° C.-450° C. and 450° C.-550° C., respectively, with the residence time of 10 hours. The bulk mesophase coke obtained from the reactor (100) is containing more than 90% anisotropy.

The graphite anode prepared from this coke gives 356 mAh/g with first cycle efficiency of 94%. It charges at 2C to 32% of it is capacity. It discharges 93% at 3C rate. This electrode may reach density of up to 1.8 g/cc.

Figure 6:
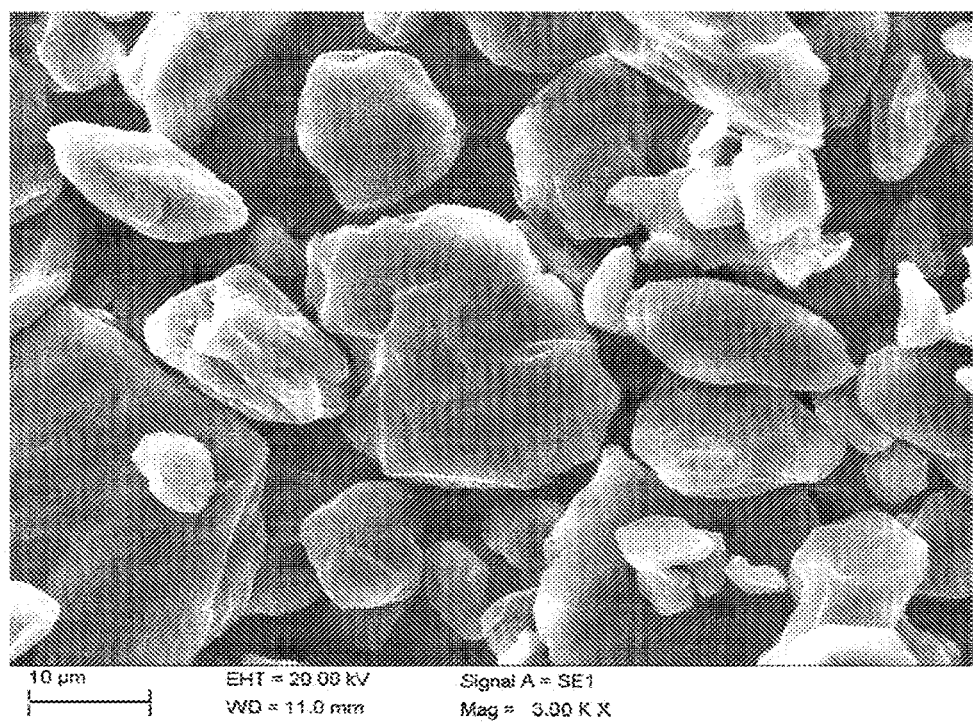
FIG. 6 illustrates a round edged graphite particles, according to various embodiments of the present invention.

Further, the graphite particles which are produced by the said process are having round edge (refer. FIG. 6). The round edged graphite particles ensure easy electrode coating process. Accordingly, the resultant high density electrode may have good porosity and particle orientation.

Furthermore, the electrode produced by the said process may have better wettability and high rate of charging and discharging.

Figure 7:
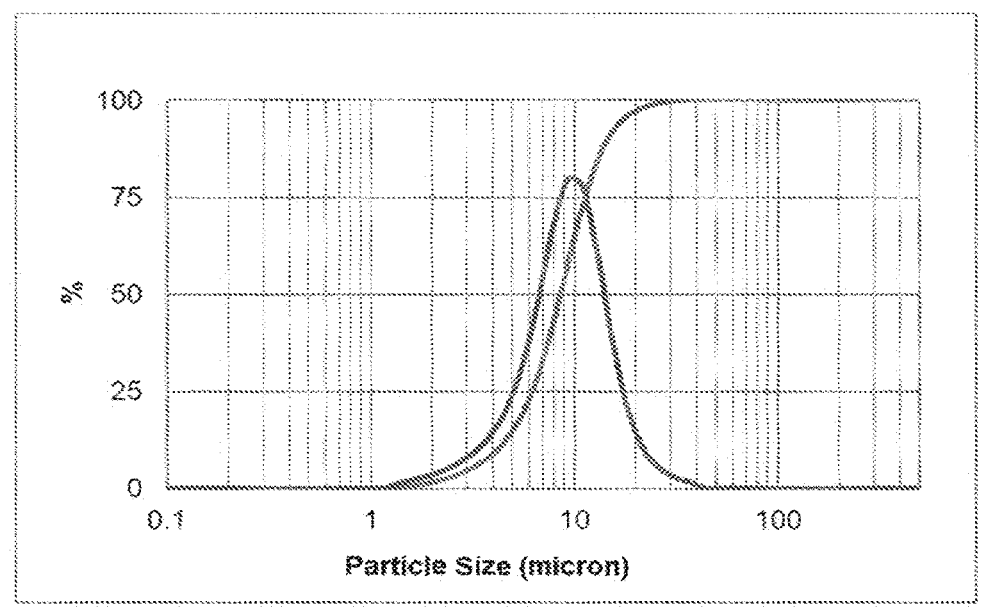
FIG. 7 illustrates a graph representing size of the graphite particles, according to various embodiments of the present invention.

As from the graph shown in FIG. 7, the size of the graphite particles may be controlled according to the requirement. Further, the graph is plotted between percentile and size of the graphite particles.

Additionally, the size of graphite particles are shown in table-1 below:

TABLE 1

| % tile | Size in Micron (μm) |
|---|---|
| 10% | 4.2 |
| 20% | 5.7 |
| 30% | 6.7 |
| 40% | 7.7 |
| 50% | 8.6 |
| 60% | 9.6 |
| 70% | 10.7 |
| 80% | 12.2 |
| 90% | 14.7 |
| 95% | 17.5 |
| 100% | 40.0 |

The feed material and process parameters of the above examples are shown in the table-2 below:

TABLE 2

| Parameters | Unit | Example-1 | Example-2 | Example-3 | Example-4 |
|---|---|---|---|---|---|
| Quinoline insoluble (QI) | % | 1.9 | 0.2 | 0.2 | 0.2 |
| First Heating Zone | % | 250-350 | 250-350 | 250-350 | 250-350 |
| Second Heating Zone | °C. | 350-500 | 350-500 | 350-500 | 350-450 |
| Third Heating Zone | °C. | 500-800 | 500-800 | 500-800 | 450-600 |
| Time | Hrs | 10 | 10 | 20 | 10 |

The properties of the battery, in which graphite anode is made from the mesophase coke with respect to the above examples are shown in table-3 below:

TABLE 3

| Parameters | Unit | Example-1 | Example-2 | Example-3 | Example-4 |
|---|---|---|---|---|---|
| Capacity | mAh/g | 335 | 355 | 362 | 355 |
| Efficiency | % | 92 | 93 | 93 | 94 |
| Electrode Density | g/cc | 1.6 | 1.6 | 1.6 | 1.8 |
| Rate of Charging 2 C/0.2 C | 335 | 48 | 30 | 28 | 32 |
| Rate of Discharging 3 C/0.2 C | % | 99 | 92 | 91 | 93 |

The comparison data of performance of the electrode formed using the mesophase coke composition prepared by the said process vis-a-vi state of the art is shown in table-4 below

TABLE 4

| Parameters | Unit | State of the art | Present invention |
|---|---|---|---|
| Capacity | mAh/g | 350 | 355 |
| Efficiency | % | 92 | 94 |
| Electrode Density | g/cc | 1.7 | 1.8 |
| Rate of Charging 2 C/0.2 C | % | 25 | 32 |
| Rate of Discharging 3 C/0.2 C | % | 88 | 93 |

Therefore, the present invention describes the process by which electrode of high density may achieved. Accordingly, this would help to make high energy density battery. Furthermore, the electrode produced has better rate of charging and discharging, which enables to make high power battery.

Therefore, the present invention is a system and a process for producing coke, which is feasible, sustainable, effective, and efficient as compared to existing processes.

The foregoing descriptions of specific embodiments of the present invention have been presented for purposes of description. They are not intended to be exhaustive or to limit the present invention to the precise forms disclosed, and obviously many modifications and variations are possible in light of the above teaching.

Further, the embodiments were chosen and described in order to best explain the principles of the present invention and its practical application, and thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

| | |
|---|---|
| 50 | Container |
| 100 | Reactor |
| 101 | Entry chamber |
| 102 | First heating zone |
| 103 | Second heating zone |
| 104 | Third heating zone |
| 105 | Cooling zone |
| 106 | Exit chamber |
| 200 | Reservoir |
| 300 | Pusher system |
| 301 | Base |
| 302 | Hydraulic pump |
| 303 | Hydraulic valve |
| 304 | Hydraulic cylinder |
| 400 | Condensing unit |
| 500 | Oil tank |
| 600 | Crushing unit |
| 700 | Pneumatic Conveying System |
| 800 | Hopper |
| 900 | Process |

The invention claimed is:

1. A system for producing mesophase coke from an isotropic pitch, the system comprising:
    a reactor comprising:
        a reservoir configured to store the isotropic pitch and feed the isotropic pitch into a container;
        an entry zone having the container, wherein the container is being adapted to receive the isotropic pitch from the reservoir, and wherein the isotropic pitch is contained within the container during processing;
        a first heating zone adapted to carry out pretreating of the isotropic pitch by operating the first heating zone at a temperature of 250° C.-350° C. under atmospheric pressure;
        a second heating zone adapted to carry out heating of the said pretreated isotropic pitch by maintaining the temperature of 350° C.-500° C. under atmospheric pressure to convert the isotropic pitch to obtain mesophase pitch;
        a third heating zone adapted to carry out heating of the mesophase pitch by maintaining the temperature of 500° C.-800° C. under the atmospheric pressure to obtain mesophase coke;
        an exit zone adapted to discharge the mesophase coke from the reactor; and
    a controlled-speed pusher unit adapted to physically move the container from the entry zone sequentially through the first heating zone, the second heating zone, the third heating zone and the exit zone to obtain the mesophase coke at the exit zone, wherein the controlled-speed pusher unit comprises a hydraulic pusher system having a hydraulic valve to regulate a flow of a hydraulic fluid to achieve variable pushing speed.

2. The system as claimed in claim 1, wherein the isotropic pitch is selected from at least one of coal tar or petroleum tar.

3. The system as claimed in claim 1, wherein the isotropic pitch has a softening point (SP) temperature in a range of 80° C. to 120° C., and has a quinolone insoluble (QI) content of less than or equal to 2%.

4. The system as claimed in claim 1, wherein the reactor further comprises a cooling zone adapted to cool the mesophase coke obtained from the third heating zone.

5. The system as claimed in claim 1 further comprising a crushing unit being adapted to crush the mesophase coke into coke granules.

6. The system as claimed in claim 5 further comprising a hopper being adapted to receive and store the coke granules.

7. The system as claimed in claim 6 further comprising a pneumatic conveying system to transport the coke granules from the crushing unit into the hopper.

8. The system as claimed in claim 1 further comprising a condensing unit being adapted to condense pitch evaporated from the system to obtain condensate oil.

9. The system as claimed in claim 8 further comprising an oil tank being adapted to store the condensate oil.

10. A process for producing mesophase coke from an isotropic pitch in the system of claim 1, the process comprising:
    feeding the isotropic pitch into the container placed in the entry zone of the reactor;
    physically moving the container to the first heating zone via the pusher unit, wherein the container is moved in a linear motion inside the reactor;
    pretreating the isotropic pitch inside the first heating zone of the reactor, wherein the first heating zone operates at a temperature of 250° C.-350° C. under atmospheric pressure;
    physically moving the container from the first heating zone via the pusher unit to the second heating zone;
    heating pretreated isotropic pitch inside the second heating zone of the reactor by maintaining the temperature of 350° C.-500° C. under the atmospheric pressure to obtain a mesophase pitch;
    physically moving the container from the second heating zone via the pusher unit to the third heating zone through the pusher unit;
    heating the mesophase pitch inside the third heating zone of the reactor by maintaining the temperature of 500° C.-800° C. under the atmospheric pressure to obtain mesophase coke;
    physically moving the container from the third heating zone via the pusher unit to a cooling zone; and
    discharging the mesophase coke from the exit zone of the reactor.

11. The process as claimed in claim 10, wherein the isotropic pitch is selected from at least one of coal tar or petroleum tar, wherein the isotropic pitch is having has a softening point (SP) temperature of less than or equal to 100° C., and quinoline insoluble (QI) content of less than or equal to 2%.

12. The process as claimed in claimed 10 comprising feeding the isotropic pitch from the reservoir.

13. The process as claimed in claim 10 further comprising cooling the mesophase coke in the cooling zone.

14. The process as claimed in claim 13 further comprising physically moving the container from the cooling zone via the pusher unit to the exit zone.

15. The process as claimed in claim 10 further comprising crushing the mesophase coke to coke granules inside a crushing unit.

16. The process as claimed in claim 15 further comprising transporting the coke granules of the mesophase coke from the crushing unit into a hopper via a pneumatic conveying system.

17. The process as claimed in claim 10 further comprising
   recovering unused pitch, the recovering-step-comprising:
   evaporating unused pitch from the reactor, and
   condensing the evaporated pitch in a condensing unit to obtain condensate oil.

18. The process as claimed in claim 17 further comprising pumping the condensate oil into an oil tank.

\* \* \* \* \*